United States Patent [19]

Hietanen et al.

[11] 4,046,215
[45] Sept. 6, 1977

[54] VESSEL MOBILE ON AIR CUSHION OR THE LIKE

[76] Inventors: Esko Hietanen, Paattistentie 141, Turku, Finland; Ari Hietanen, deceased, late of Turku, Finland; by Margo-Ritta Hietanen, heiress, Riutojankatu 1 aA 183, Turku, Finland

[21] Appl. No.: 618,140

[22] Filed: Sept. 30, 1975

[30] Foreign Application Priority Data

Oct. 4, 1974 Finland ............................ 2905/74

[51] Int. Cl.² ........................................ B60V 1/00
[52] U.S. Cl. ................................. 180/116; 180/117; 180/120; 244/23 R
[58] Field of Search ............... 180/116, 117, 120, 118, 180/119; 115/67 R, 67 A; 244/23 P, 23 D, 12 D

[56] References Cited

U.S. PATENT DOCUMENTS

| | | | |
|---|---|---|---|
| 3,117,545 | 1/1964 | Warner | 180/116 X |
| 3,159,361 | 12/1964 | Weiland | 180/116 X |
| 3,189,115 | 6/1965 | Rethorst | 180/116 X |
| 3,190,582 | 6/1965 | Lippisch | 180/116 X |
| 3,279,554 | 10/1966 | Hunt | 180/127 |
| 3,292,864 | 12/1966 | Edkins | 244/23 D |
| 3,608,663 | 9/1971 | Ferguson | 180/120 |
| 3,830,179 | 8/1974 | Lippisch | 180/119 |
| 3,869,020 | 3/1975 | Holland | 180/120 |

*Primary Examiner*—Robert R. Song
*Attorney, Agent, or Firm*—Schuyler, Birch, Swindler, McKie & Beckett

[57] ABSTRACT

A propeller driven vehicle, such as an air cushion hovercraft, comprising a hull, a teardrop shaped cabin mounted on the hull and a propeller arranged in front of the cabin. A gutter shaped obstructing plate is pivotally mounted to each side wall of the cabin and is movable between a horizontal and vertical position. When the obstructing plate is moved from its horizontal position to obstruct the air flow from the propeller around the side wall of the cabin, a pressure differential is created on the cabin which is effective in steering the vehicle.

6 Claims, 3 Drawing Figures

VESSEL MOBILE ON AIR CUSHION OR THE LIKE

A vessel mobile on an air cushion or the like.

The invention relates to a vessel that is mobile on an air cushion or the like and which is provided with a driving properller.

A maneuvering method for hovercraft is previously known in which the bow of the vessel is turned in the desired direction by means of a side rudder located immediately behind a propeller, whereby the propulsive force of the propeller drives the vessel in the desired direction. Similarly there is known a method in which the plane of rotation of the propeller is turned about its vertical axis either to the right or to the left, thus creating the side force required for maneuvering.

However, the disadvantage of these methods is the fact that the plane of rotation of the propeller must be turned into an inclined angle in relation to the air stream, whereby the driving properties of the propeller are remarkably decreased and the vessel slides sideways, the alteration of course being negligible. When the speed of the vessel is decreased, the side rudder immediately behind the propeller loses its effect and maneuvering becomes a great deal more difficult.

For stopping air propeller driven vessels there are several methods:
 a. the rotation of the propeller is reduced,
 b. the angles of the propeller blades are adjusted to produce a retarding force,
 c. the whole vessel is turned 180° about the vertical axis, whereby the propulsive force of the propeller turns into a force resisting the motion.

There are several drawbacks in these methods: the vessel does not stop in wind aft, poor braking effect; the original construction of the propeller cannot be applied to produce great retarding forces; turning the vessel sharply is a troublesome and dangerous procedure.

All these braking methods have poor effects, nor do they provide a possibility of maintaining maneuverability, and possible engine failure always presents a danger.

The object of the present invention is to overcome the above drawbacks by providing a vessel with good maneuverability even in difficult situations.

These and other objects of the invention are provided by a hovercraft having the propeller placed in the front part of the vessel's hull, the air stream guiding walls of the cabin being substantially vertical, the side rudders or stabilizers being located in the rear part of the hull in a vertical position, and gutter-like elements or channels pivotable between horizontal and vertical positions provided behind the propeller.

The hovercraft of the invention has the following advantages in accordance with test results:
 radii of curves which the hovercraft can turn are small even at great speeds and sideways sliding occurs to a lesser degree than with conventional hovercrafts,
 the vessel's course can be easily maintained even at increased speeds, and
 braking distances are remarkably short. In addition, turning of the hovercraft can be performed during braking by using the channels asymmetrically,
 when decreasing the speed of the hovercraft the effect of the side rudder is maintained,
 the hovercraft has the capability of reversing and of altering its course during reversal, and
 in case of engine failure the vessel can be quickly stopped from high speeds while still maintaining continuous maneuverability.

Preferably the rear part of the cabin is pivotably attached to the main portion of the cabin thus serving as a side rudder. The distance between the propeller and the side rudder is large.

The invention will hereinafter be described in more detail with reference to the accompanying drawings in which.

Figure 1:
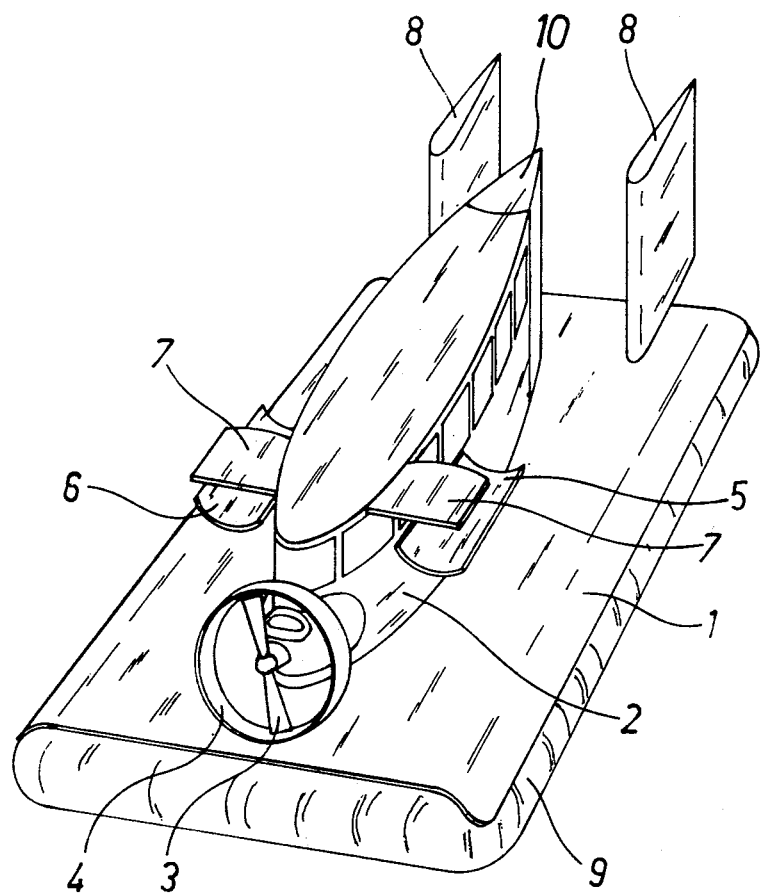
FIG. 1 is a perspective view of the hovercraft according to this invention.
Figure 2:
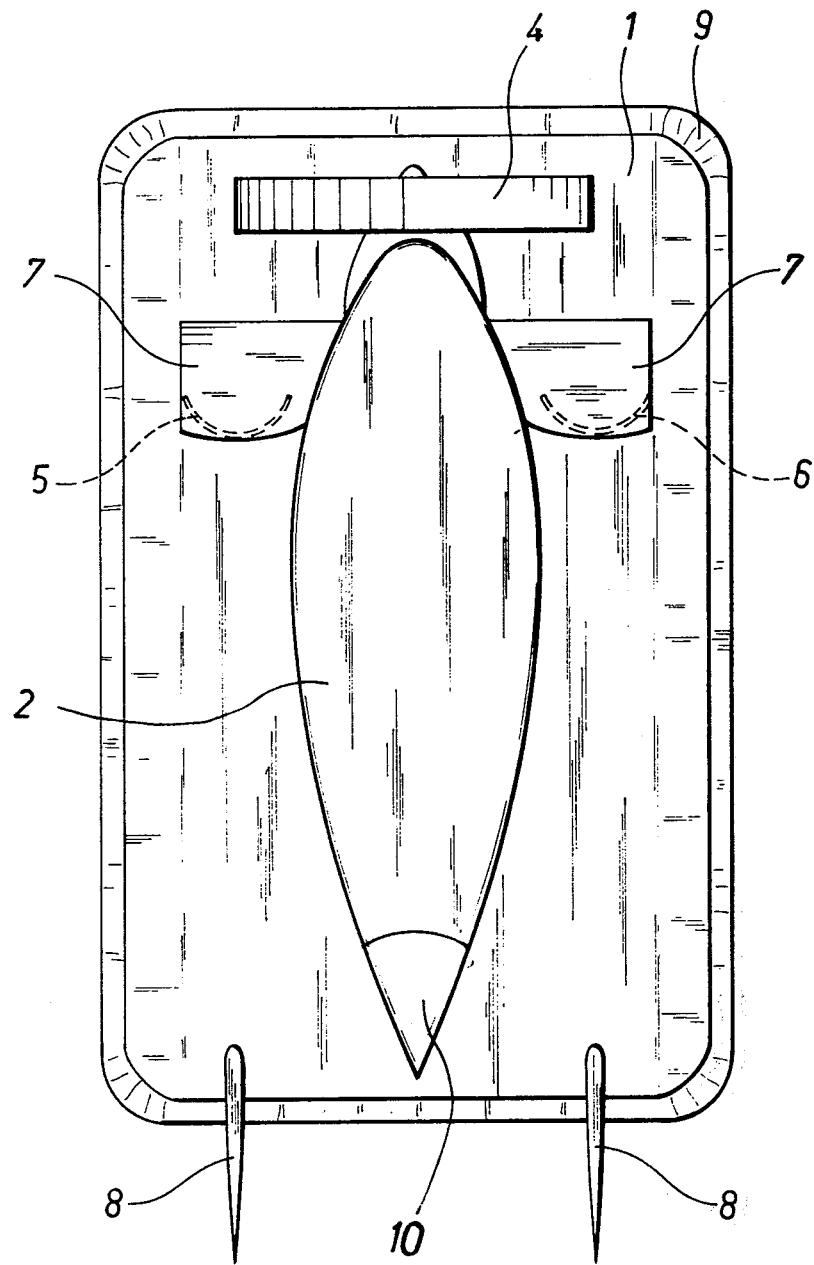
FIG. 2 is a top plan view of the vessel according to the FIG. 1.

The hull, of the vessel is formed by the horizontal base plate 1 which rests on and is supported by the air cushion 9. On the base plate is mounted the aerodynamic droplet-shaped cabin 2 which is provided with vertical sides, and in front of which the motor and the air propeller 3 are located on the centre line of the hull. The rear part 10 of the cabin is pivotable and is connected to the main portion of the cabin 2 in such a manner that the droplet-shaped design of the cabin 2 is maintained. On either side of the cabin and above the vessel's centre of gravity there are mounted the gutter-like elements 5, 6 which are centrally provided with hinges and can be pivoted together or separately from a horizontal plane to a vertical plane so that the air stream produced by the propeller 3 is turned by the channel like plates 5, 6.

Figure 3:
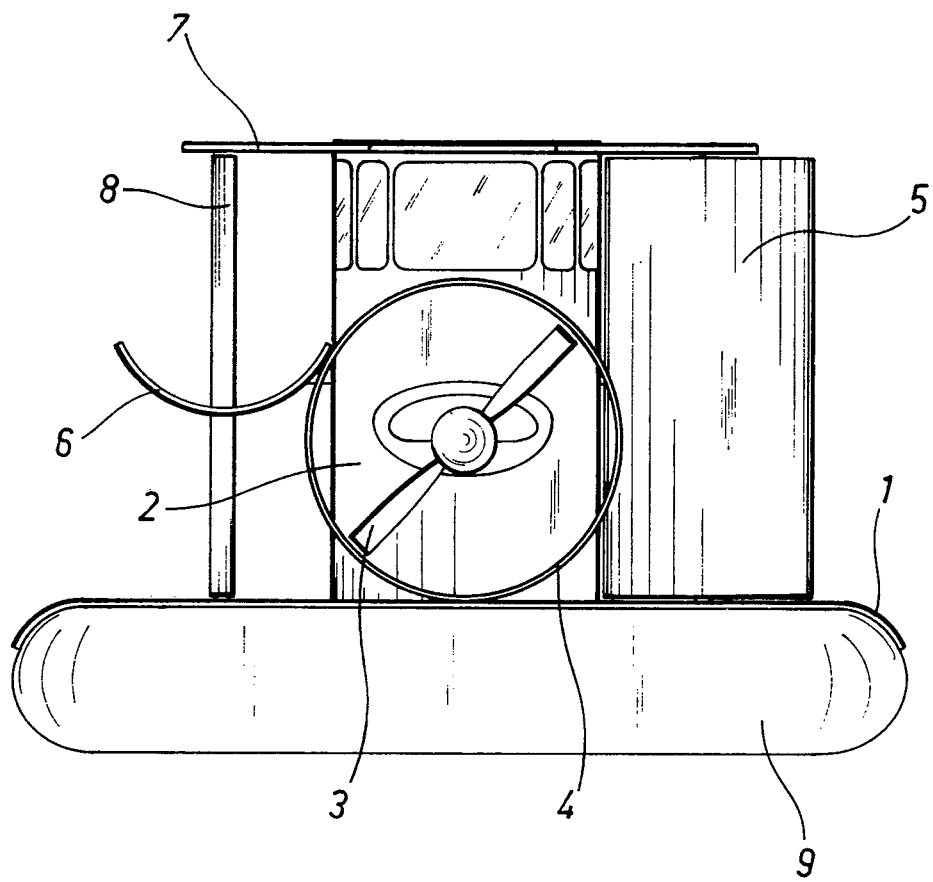
FIG. 3 is a front view of the same vessel.

In addition, in the plane of the cabin roof and above the gutter elements 5 and 6, stationary wings 7 are provided which, together with the base plate, force the propeller stream to remain substantially in horizontal plane, thereby preventing the air stream from escaping over and under the edges of the gutter elements 5 and 6 when the gutter elements are in vertical position as seen in FIG. 3. In the rear part of the hull there are conventional side rudders 8.

When the propeller is running, the cabin 2 divides the air stream produced by the propeller into two halves on both sides of the vessel. By means of the cabin rudder 10 and the side rudders 8 the desired direction of motion is chosen. If the bow of the vessel is turned to the right as the vessel is moving at high speed, the propulsive force of the propeller tends to swing the vessel onto a track of motion curving to the right. Simultaneously, the air stream directed towards the vessel meets the vertical side surface of the cabin at an inclined angle from the left, and thus a force is created directed towards the centre of the curve, i.e. to the right.

The vessel is held on course by the forces caused by the propeller and the pressure developed on the cabin walls. It can be shown that the side force applied on the cabin increases in the same proportion as the kinetic energy of the vessel which results in a remarkably smaller turning radius than that obtained with conventional hovercraft.

If a sharp alternation of course is attempted with the vessel, then the air stream meets the longitudinal axis of the cabin at a greater angle, and the air stream tends to detach from the inside curved wall of the cabin as in the case of an aircraft wing when the angle between the striking air stream and the centre line of the wing profile grows larger.

This would result in considerable loss of side force. Since the propeller, in the maneuvering system of the invention, blows a fast air stream along the surface of the cabin directed towards the inside of the curve, such turbulence does not occur. The propeller provides a faster air stream on the part directed towards the inside of the curve, which results in a pressure difference between the right and the left sides of the wheel house. This pressure difference produces a force whose effect is directed towards the direction of the faster propeller stream perpendicularly outwards from the cabin i.e. towards the centre of the curve. Thanks to the combined effect of all these forces it is possible, with the hovercraft of this invention, both to run very tight curves and to decrease running speed quickly only by sharpening the angle of impact.

The hovercraft of the invention is stopped by pivoting the gutter elements 5, 6 secured at their central parts to the sides of the cabin with hinges and located at the centre of gravity, or its immediate proximity, simultaneously up so that the air stream generated by the propeller is turned and directed forward thus causing powerful retardation. By using the gutter elements separately the course can be maintained during the retardation. The wings 7 on the both sides and on the top of the vessel and above the gutter elements force the propeller stream in a horizontal plane and increase the retarding effect of the stream. By keeping the gutters in vertical plane the vessel can be reversed and, by pivoting one of the gutters temporarily towards the horizontal plane, the vessel can be turned during the reversal. By keeping one gutter in the horizontal plane and pivoting the other up in a vertical position, the vessel can be swung around on a spot.

Since, in order to turn the propeller stream forward, the total area of the gutters and the front surfaces of the cabin must be greater than the surface area of the propeller periphery, the gutters serve as effective brakes in case of engine failure, and this is not possible with other hovercraft maneuvering systems. Contrary to other hovercrafts the distance between the propeller and the rudder, in the system of the invention, is long which leads to the advantage that, when the rotational speed of the rotational speed of the propeller is decreased, the effect of the side rudder remains sufficient in all conditions.

In the system according to the invention the propeller stream sweeps powerfully along the surface of the hull and the cabin thus adding to the effect of the side rudder and keeping the windows and structures of the wheel house clean of dust, dirt, water, snow, and ice. Similarly it should be understood that pieces of ice and snow possibly dropping off the vessel are swept away by the air stream along the cabin sides and the exhaust gases of the propeller and, thus, cannot damage the fast rotating air propeller.

Because the gutter elements 5, 6 required for turning the propeller stream are supported at their centre in horizontal plane, the turning of the gutters to vertical position, and vice versa, can be manually performed by the operator, whereby complicated auxiliary equipment is not required.

The outer edges of the gutter elements can be hinged in such a way that the propeller stream can, if desired, be directed also aside in either direction and thus the effect of side wind can be eliminated during retardation and when driving in narrow passages.

In the example the air cushion can be maintained either by means of the driving motor or the vessel can be provided with a separate motor and a blower for maintaining the air cushion.

The above example is just the description of one embodiment according to the invention. The vessel of the invention can be considerably modified as to its details. Thus, for example, the side rudders 8 can be removed, whereby the vessel is maneuvered only by means of the gutter elements 5, 6.

Moreover, the example illustrates a base provided with the air cushion 9. However, the air cushion can be replaced with or it can additionally be provided with skis, or it can be provided with a boat bottom.

We claim:
1. An air cushion vehicle comprising
 a. a hull;
 b. means for supporting said hull on an air cushion;
 c. a cabin having vertical side walls mounted on said hull, said side walls being curved in a longitudinal direction to form a teardrop shape for said cabin;
 d. a propeller arranged in front of said cabin, said side walls guiding the flow of air from said propeller rearwardly; and
 e. at least one obstructing plate pivotally mounted on each said side wall for movement between a horizontal and vertical position, each said plate when moved from said horizontal position capable of disturbing the flow of air around the respective side wall to cause a pressure differential on said cabin to assist in steering the vehicle.

2. A vehicle according to claim 1 further comprising rudders mounted on the rear portion of said hull.

3. A vehicle according to claim 2 wherein said obstructing plates are gutter shaped.

4. A vehicle according to claim 3 wherein the rear portion of said cabin is pivotally attached by bearings to the front portion of said cabin for movement about a vertical axis, whereby said rear portion acts as a rudder.

5. A vehicle according to claim 3 wherein said gutter shaped plates are limited in their vertical position by a base plate at the bottom and by a wing at the top.

6. A vessel according to claim 5 wherein said base plate forms said hull and said wing is attached to the top of said cabin.

* * * * *